(12) United States Patent
Niemoeller et al.

(10) Patent No.: US 9,796,867 B2
(45) Date of Patent: Oct. 24, 2017

(54) COATING COMPOSITION FOR HOT SEALABLE, INKJET PRINTABLE IMAGE TRANSFER MATERIAL

(71) Applicant: Sihl GmbH, Duren (DE)

(72) Inventors: Axel Niemoeller, Dueren-Niederau (DE); Manfred Schaefer, Cologne (DE); Roy Keulders, Heerlen (NL)

(73) Assignee: SIHL GMBH, Duren (DE)

( * ) Notice: Subject to any disclaimer, the term of this patent is extended or adjusted under 35 U.S.C. 154(b) by 0 days.

(21) Appl. No.: 14/710,500

(22) Filed: May 12, 2015

(65) Prior Publication Data

US 2016/0130456 A1   May 12, 2016

(30) Foreign Application Priority Data

Nov. 12, 2014 (DE) .................. 10 2014 016 674

(51) Int. Cl.
*B41J 2/01* (2006.01)
*C09D 101/14* (2006.01)
*B41M 5/52* (2006.01)

(52) U.S. Cl.
CPC .............. *C09D 101/14* (2013.01); *B41M 5/52* (2013.01); *B41M 5/5236* (2013.01)

(58) Field of Classification Search
CPC ............................ C09D 101/14; B41J 11/002
USPC .......... 347/102, 103; 428/32.16, 220, 32.38; 106/170.21
See application file for complete search history.

(56) References Cited

U.S. PATENT DOCUMENTS

| 2,379,974 | A | * | 7/1945 | Little .................. C09D 101/08 106/169.19 |
| 2,955,043 | A | | 10/1960 | Rosenthal |
| 6,824,839 | B1 | * | 11/2004 | Popat et al. ............... 428/32.12 |
| 7,588,812 | B1 | | 9/2009 | Patel |
| 2003/0007058 | A1 | * | 1/2003 | Odamura et al. ............ 347/187 |
| 2004/0202840 | A1 | * | 10/2004 | Do et al. .................... 428/195.1 |
| 2009/0061235 | A1 | | 3/2009 | Cooper |
| 2013/0202860 | A1 | * | 8/2013 | Wei .......................... C08J 7/047 428/196 |

FOREIGN PATENT DOCUMENTS

| GB | 880 050 A | 10/1961 |
| WO | 2008/002795 A1 | 1/2008 |
| WO | 2009/018419 A1 | 2/2009 |
| WO | 2010/085569 A1 | 7/2010 |
| WO | 2011/141878 A1 | 11/2011 |
| WO | 2012/024472 A1 | 2/2012 |

OTHER PUBLICATIONS

Extended European Search report dated Apr. 11, 2016 for 15194220.8-1302.

\* cited by examiner

*Primary Examiner* — Henok Legesse
(74) *Attorney, Agent, or Firm* — Knobbe, Martens, Olson & Bear, LLP

(57) ABSTRACT

The present invention relates to a coating composition for a heat sealable, inkjet printable image transfer material, an article comprising said coating composition in form of at least one heat sealable, inkjet printable layer, a method for applying graphical information to a surface of an object using a heat sealable, inkjet printable image transfer material comprising said coating composition and a method of making such a coating composition.

26 Claims, 1 Drawing Sheet

COATING COMPOSITION FOR HOT SEALABLE, INKJET PRINTABLE IMAGE TRANSFER MATERIAL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to a coating composition for a heat sealable, inkjet printable image transfer material, an article comprising said coating composition in form of at least one heat-sealable, inkjet printable layer, a method for applying graphical information to a surface of an object using a heat-sealable, inkjet printable image transfer material comprising said coating composition and a method of making such a coating composition.

Description of the Related Art

Inkjet printing is a widely used process for applying graphical information and images, including multi-color images, to a substrate. In such a process, solvent-containing ink droplets are deposited from a nozzle onto an absorbent substrate, e.g. paper, to form the image. Rapid absorption of the ink into the substrate is a requirement for good image quality and to obtain images with a high color gamut and without printing defects. Most substrates need a special inkjet ink absorbing coating for good printing results. The inkjet coating formulations have to be adjusted to the specific substrate, papers for instance need different coatings than films. Moreover, there are numerous substrates which cannot be imaged in good quality by direct inkjet printing, including, for instance, substrates made of glass, metals, plastics and the like.

For this reason, image transfer materials have been developed comprising a film of readily printable material. The ink receiving film of the image transfer material usually is first printed and then transferred and adhered by means of one or more suitable adhesive layers to various substrates, including non-absorbent, sensitive, very thin or very thick materials and/or those having uneven surfaces, which cannot be readily provided with graphical information or an image by direct inkjet printing.

In order to provide high quality images which are applicable to a wide range of materials, an image transfer material should be transparent and substantially colorless, so that after transfer to a particular substrate essentially only the information/image provided by said material is perceived by an observer, but no unprinted parts of the transfer material. Ideally, such a transfer material is capable of adhering to a wide range of different substrate materials, including materials made of metal, glass, wood, plastics, ceramics, elastomers, rubber, fabrics, textiles, paper, cardboard and the like as well as mixtures thereof, without being limited to these.

WO 2008/002795 A1 describes image transfer films for graphic substrates, which can be laminated onto a graphic substrate by means of heat and pressure. In the method described therein, an image is printed onto a transparent thermoplastic protective layer by an inkjet printer using an organic solvent-based ink comprising said solvent, a thermoplastic material and a pigment. Preferably, the transparent thermoplastic protective layer and the thermoplastic material of the ink both comprise an urethane-acrylate copolymer and soften during lamination, thereby adhering or bonding to the graphic substrate. As graphic substrates, mainly polymeric materials are discussed in WO 2008/002795 A1.

Further heat transfer materials, which may be applied to a broader variety of substrates, usually include a separate adhesive film coated or laminated to one side of the ink receiving layer of the image transfer material. Such articles are described, for instance, in WO 2009/018419 A1. While such materials usually can be applied to a wide variety of different substrates, including those having uneven surfaces, the need of a separate adhesive layer is a drawback in producing such films.

Moreover, depending on the thickness and the kind of layers used in such a multi-layer coating stack, the transparency of the image transfer material may drop and delamination within the layered structure may occur under certain conditions.

Thus, it would be advantageous to provide an inkjet printable image transfer material which combines the inkjet receiving and the adhesive function in one single layer, while nevertheless being applicable to substrates comprising a variety of different materials and/or structures, including curved and/or uneven surfaces. Further, unless intentionally modified by adding a colorant, the non-printed parts of such an image transfer material should be essentially colorless and transparent. Moreover, it should be possible to provide a very thin transfer image using said material.

It has surprisingly been found that such an inkjet printable image transfer material which is heat-sealable can be provided when a mixture of at least one cellulose-based binding agent, at least one rosin-based tackifier and at least one plasticizer is used. Using said combination, it is possible to provide a coating, which combines adhesive and inkjet-receiving properties in one single layer, so that printable and transferable films can be provided which are chemically and mechanically durable, even if provided at a rather low thickness. Using said combination of ingredients, it is further possible to provide a substantially colorless and transparent inkjet printable image transfer material which can be applied to a variety of different materials, including glass, plastics, paper, metal and the like, without being limited to these, at comparable low transfer temperatures. Herein, a transparent material preferably has a light transmittance of at least 60%, determined according to DIN 53147 or ISO 22891. Moreover, the outer surface of the transferred image material can be modified after printing to adjust its surface structure and/or gloss to match the look and feel of the target material.

SUMMARY OF THE INVENTION

Thus, the present invention relates to a coating composition for a heat sealable, inkjet printable image transfer material comprising at least one cellulose-based binding agent, at least one rosin-based tackifier, and at least one plasticizer.

DETAILED DESCRIPTION OF THE PREFERRED EMBODIMENT

Figure 1:
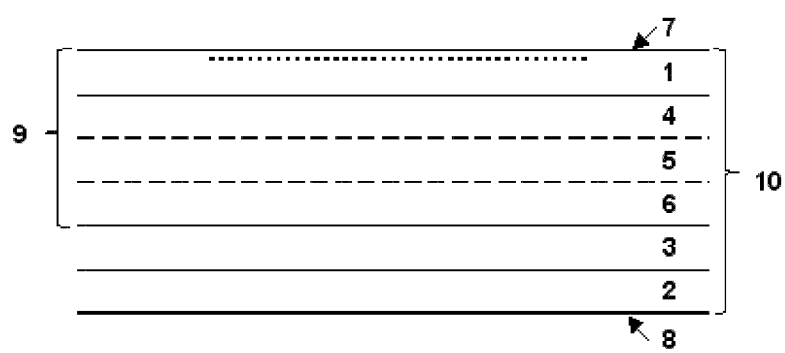
FIG. 1 schematically illustrates an exemplary heat sealable, inkjet printable image transfer material 10 of the present invention in form of a multilayer coating stack 9 comprising a coating composition/heat sealable, inkjet printable layer 1 and three additional layers 4, 5, 6 over a temporary carrier layer 2 provided with a release layer 3, said image transfer material having a first and a second outer surface 7, 8. The image printed on the heat sealable, inkjet printable layer 1 is indicated by a dotted line.
Figure 2:
FIG. 2 illustrates an exemplary article 12 according to the present invention comprising an object 11 to the surface of which the multilayer coating stack 9 has been affixed.

Herein, the term "coating composition" refers to both the solvent-comprising compositions/formulations for applying such a coating onto, for instance, a temporary carrier layer and to the coating formed after evaporation of said solvent.

In terms of the present invention, the term "heat sealable" (sometimes also referred to as "hot sealable") refers to a material that due to its thermoplastic nature can be joined with a similar or dissimilar material using heat, i.e. a temperature above room temperature (23° C.), and optionally also pressure. It should be understood that not every possible layer of a multi-layered image transfer material has to be thermoplastic, i.e. applicable or moldable above a specific temperature, returning to solid state upon cooling, for the image transfer material to be heat sealable. However, in terms of the present invention at least those layer(s) formed from the coating composition of the present invention are heat sealable, making the image transfer material heat sealable as a whole.

Due to the presence of the above coating in the image transfer material, the layer formed from said coating can be readily printed by inkjet printing, applying latex, UV curing, waterborne as well as organic solvent borne inks. Inks comprising organic solvents may be preferred in the present invention. These kinds of inks include so-called "ecosolvent", "low solvent" or "mild solvent" inks and usually comprise medium to high boiling organic solvents as carrier medium for dyes, pigments, dispersants, stabilizers, binders and other ingredients. They are marketed e.g. by Roland Deutschland GmbH (Willich, Germany), Mutoh Deutschland GmbH (Dusseldorf, Germany) and Mimaki Deutschland GmbH (Herrsching, Germany), such as Eco-Sol MAX Ink from Roland Deutschland GmbH. Typically printers with piezo inkjet print heads are suitable for these inkjet inks. Special colors can be achieved by using metallic or white inks. White inks are particularly suitable to increase the opacity of colored areas when printed in the back of these colors, i.e. underlying them. This printing technique allows high quality printing onto colored or metallic target materials.

In terms of the present invention, the cellulose-based binding agent preferably is the main component of the coating composition of the present invention, based on the dry weight of the composition, and acts to form a cohesive and preferably self-supporting layer mechanically and/or chemically.

In terms of the present invention, a tackifier is a chemical compound or mixture of compounds which serve(s) to increase the hot tack, i.e. the stickiness at elevated temperatures (>50° C.) of the surface of a layer formed from the coating composition of the present invention. At room temperature the surface layer preferably is not tacky, so that it does not adhere to the backside of the temporary carrier material. This backside may be composed of paper surface or a film surface and may comprise a coating, e.g. suitable for transport in inkjet printers. This backside may have particular properties like surface structure, e.g. matt or rough surface, or antistatic and/or anti-adhesion properties.

The plasticizer being present in the inventive coating composition is chemically different from the cellulose-binding agent and the rosin-based tackifier and serves to increase the plasticity and flexibility of the material.

The coating composition of the present invention preferably may comprise 40 to 90 wt.-%, based on the dry weight of the composition, of one or more binding agents. The amount of binding agent(s) in the coating composition of the present invention preferably should not be lower than 40 wt.-%, as otherwise the cohesion of the film may suffer. As the transfer film is protecting the image after transfer, it should not have any tackiness at room temperature and should not be deformed by mechanical impact easily. If the amount of binding agent(s) is above 90 wt.-%, the tackiness of the coating for adhesion to a broad variety of substrates may suffer. Preferably, the coating composition of the present invention may comprise 50 to 70 wt.-%, based on the dry weight of the composition, of one or more binding agents. Herein, the percentage of cellulose-based binding agent(s) from the total amount of binding agent(s) in the coating composition of the present invention is at least 50 wt.-%, preferably at least 75 wt.-%, more preferably at least 80 wt.-% and even more preferably at least 90 wt.-%, based on the total weight of binding agent(s) in the coating composition of the present invention. The binding agent(s) in the coating composition of the present invention may also exclusively consist of cellulose-based binding agent(s), i.e. its/their percentage from the total amount of binding agent(s) in the coating composition of the present invention may also be 100 wt.-%.

The coating composition of the present invention preferably may comprise 5 to 50 wt.-%, based on the dry weight of the composition, of one or more tackifiers. Non-rosin tackifiers may be added optionally. Herein, the percentage of rosin-based tackifier(s) from the total amount of tackifier(s) in the coating composition of the present invention is at least 50 wt.-%, preferably at least 75 wt.-%, more preferably at least 80 wt.-% and even more preferably at least 90 wt.-%, based on the total weight of tackifier(s) in the coating composition of the present invention. The tackifier(s) in the coating composition of the present invention may also exclusively consist of rosin-based tackifier(s), i.e. its/their percentage from the total amount of tackifier(s) in the coating composition of the present invention may also be 100 wt.-%.

The coating composition of the present invention preferably may comprise 5 to 50 wt.-%, based on the dry weight of the composition, of one or more plasticizers. Print characteristics like drying time, ink coalescence and image density as well as the strength of adhesion to a variety of different target substrates of the coating composition of the present invention may be adjusted by varying the quantities of binding agent, plasticizer and tackifier as well as optional further additives in the formulation, depending on the particular substance(s) chosen in each class.

Optionally, in addition to at least one binding agent, at least one tackifier and at least one plasticizer as described above, the coating composition of the present invention may also comprise organic and/or inorganic pigments and/or fillers. Said pigments or fillers preferably may be present in an amount ranging of from 0.1 to 10 wt.-%, based on the dry weight of the composition. Particulate fillers may be preferred, in particular those having a medium particle size dv50 being in the range of from 0.1 to 50 μm. Particle size measurement is conducted with laser diffraction method according to ISO 13320 (2009 Dec. 1) with a Beckmann Coulter LS device (LS 13-320, Beckmann Coulter Corporation, Brea, Calif., USA).

Suitable particles and fillers include particulate silica, alumina, aluminum oxide hydroxide, polyolefins, poly (meth)acrylates, polyurethanes, polyamides, polyureas as well as mixtures thereof, without being limited to these. Further suitable particulate materials include chalk, calcium carbonate, magnesium carbonate, kaolin, calcined clay, pyrophylite, bentonite, zeolite, talc, synthetic aluminum and calcium silicates, diatomateous earth, anhydrous silicic acid powder, aluminum hydroxide, barite, barium sulfate, gypsum, calcium sulfate, copoly(methylmethacrylate/divinylbenzene), polystyrene, copoly(vinyltoluene/t-butylstyrene/methacrylic acid), and the like.

The use of pigments in the coating composition of the present invention may be preferred in order to adjust the gloss level of the outer surface of the image transfer material of the present invention and/or in order to modify the surface characteristics, e.g. concerning improved scratch resistance, slip properties and reduction of tackiness and the like, without being limited to these.

In addition to or instead of such pigments and/or fillers, the coating composition of the present invention optionally may comprise one or more components which preferably may be selected from the group consisting of solvents, colorants and dyes, heat and/or ultraviolet light stabilizers, UV absorbers, free radical scavengers, surfactants, wetting agents, dispersing aids, anti-foaming agents, deaerators, rheological additives, substrate wetting and anti-cratering additives, ink fixing agents, flow improvers, antioxidants, brighteners, phosphorescence agents, cross-linking agents and mixtures thereof.

The at least one cellulose-based binding agent in the coating composition of the present invention preferably may be selected from the group consisting of cellulose esters, cellulose ethers and mixtures thereof. Herein, the term "cellulose esters" comprises both, organic as well as inorganic esters of cellulose. In inorganic esters the hydroxyl groups of cellulose have been partially or fully reacted with inorganic acids, for instance nitric acid or sulphuric acid, to obtain nitrocellulose or cellulose sulphate. Preferred among the cellulose esters are, however, organic esters, wherein the hydroxyl groups of cellulose have been partially or fully reacted with at least one organic acid.

Cellulose ethers are cellulose derivatives, in which the hydroxyl groups of the cellulose have been partially or fully reacted with a reagent to obtain an ether bond. Cellulose ethers in terms of the present invention include alkyl ethers, such as, for instance, methyl cellulose, ethyl cellulose or ethyl methyl cellulose, hydroxyalkyl cellulose ethers, such as, for instance hydroxyethyl cellulose and hydroxypropyl cellulose, carboxyalkyl cellulose ethers, such as, for instance, carboxymethyl cellulose (CMC), as well as mixtures and mixed derivatives thereof, such as, for instance, hydroxyethyl methyl cellulose, hydroxypropyl methyl cellulose and ethylhydroxy ethyl cellulose.

Preferably, the at least one cellulose-based binding agent may be selected from the group consisting of mixed cellulose esters, i.e. esters comprising a combination of different acyl groups. More preferably, said mixed cellulose esters may comprise a combination of different acyl groups selected from the group consisting of acetyl, butyryl, propionyl and trimellityl groups. Most preferably, the at least one cellulose-based binding agent may represent cellulose acetate propionate or cellulose acetate butyrate or a mixture thereof.

Such preferred cellulose ethers and cellulose esters are commercially available, for instance from Eastman Chemical Company, Kingsport, Tenn., US.

Preferred cellulose acetate butyrate (CAB) binding agents may have a number average molecular weight $M_n$ being in the range of from 10.000 to 90.000 g/mol, determined as polystyrene equivalent number average molecular weight by gel permeation chromato-graphy, a butyryl content being in the range of from 30 to 70 wt.-% and/or a glass transition temperature $T_g$ being in the range of from 80 to 170° C. Preferred cellulose esters may comprise from 30 wt.-% to 50 wt.-% butyryl and/or propionyl groups, from 0.05 wt.-% to 20 wt.-% acetyl groups and between 0.5 and 10 wt.-% hydroxyl groups. Such preferred cellulose esters are commercially available, e.g. from Eastman Chemical.

According to the well-acknowledged definition known to those skilled in the art, a rosin, also called colophony or Greek pitch, is a resin obtained from pines and other plants, such as conifers, produced by heating fresh liquid resin to vaporize the volatile liquid terpene components. Rosin mainly consists of different resin acids, in particular abietic acid. The rosin-based tackifier of the coating composition of the present invention preferably may comprise at least one fully or partially hydrogenated rosin or an ester thereof. Preferably, the rosin-based tackifier may comprise at least one ester of a fully or partially hydrogenated rosin, more preferably at least one ester of a fully or partially hydrogenated rosin selected from the group consisting of ethyl, ethylene glycol, diethylene glycol, glyceryl, methyl, pentaerithrityl and triethylene glycol esters and mixtures thereof.

Preferably, the rosin-based tackifier(s) may have a softening point, which is in the range of from −50 to 150° C., determined according to the ring and ball method of ASTM E28, more preferably of from −10° C. to 90° C. In addition, it may be particularly preferred that the above-mentioned rosin-based tackifiers have a Gardner color of equal to or less than 7, more preferably of equal to or less than 5 and even more preferably of equal to or less than 3.

The Gardner color scale, as specified in ASTM D1544-04, is a single number color scale for grading light transmitting samples with color characteristics from light yellow to brownish-red, wherein the scale is defined by the chromaticity of glass standards numbered from 1 for the lightest and 18 for the darkest. Liquid resins are measured as is/neat. Solid resins are measured as resin solutions, e.g. 50% in toluene or xylene.

Suitable rosin-based tackifier are commercially available, for instance from Eastman Chemical Company under the trade names Foral™, Foralyn™, Pentalyn™ Permalyn™ and Stabelite™, from Arizona Chemical (Jacksonville, Fla., USA), Arakawa Chemical USA Inc. (Chicago, Ill., USA), from Foreverest (Xiamen City, China) or from Teckrez Inc. (Fleming Island, Fla., USA).

The at least one plasticizer in the coating composition of the present invention preferably may be selected from the group consisting of optionally epoxidized oils, fatty acids as well as esters thereof, benzoates, glyceryl esters, esters of polycarboxylic acids with linear or branched aliphatic alcohols, (poly)glycol esters, sulfonamides, polymeric plasticizers and mixtures thereof. More preferably, the at least one plasticizer may be selected from the group consisting of epoxidized vegetable oils, oleates, caprates, tallates, glyceryl esters, (poly)glycol esters, alkyl azelates, alkyl citrates, alkyl glutarates, alkyl phthalates, alkyl trimellitates, alkyl adipates, alkyl sebacates, alkyl maleates, alkyl terephthalates, N-(n-butyl) benzene sulfonamide and mixtures thereof. Examples of such preferred plasticizers, are, for instance, triethyl citrate, triethyl 2-acetyl citrate, tributyl citrate, tributyl-2-acetyl citrate, phthalates, such as, for instance, bis(2-ethylhexyl)phthalate (DEHP), diisononyl phthalate (DINP), di-n-butyl phthalate (DnBP or DBP), butyl benzyl phthalate (BBzP), diisodecyl phthalate (DIDP), dioctyl phthalate (DOP or DnOP), diisooctyl phthalate (DIOP), diethyl phthalate (DEP), diisobutyl phthalate (DIBP), di-n-hexyl phthalate, trimellitates, such as, for instance, trimethyl trimellitate (TMTM), tri-(2-ethylhexyl) trimellitate (TEHTM), tri-(n-octyl, n-decyl)trimellitate (ATM), tri-(heptyl, nonyl)trimellitate (LTM), n-octyl trimellitate (OTM), adipates, sebacates and maleates, such as, for instance, bis(2-ethylhexyl)adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), sulfonamides, such as, for instance, N-ethyl toluene sulfonamide (ETSA, ortho and para isomers), N-(2-hydroxypropyl)benzene sulfonamide (HP-BSA), N-(n-butyl)benzene sulfonamide (BBSA-NBBS), polymeric plasticizers, such as polyesters of aliphatic dicarboxylic acids, e.g. polyadipates, such as polyesters of adipic acid and butanediol, and combinations thereof, without being limited to these.

In addition to at least one cellulose-based binding agent, the coating composition of the present invention may further comprise one or more additional binding agents, which are not cellulose-based. These one or more binding agents preferably may be selected from the group comprising acrylic (co)polymers, polyurethanes, polyvinyl alcohols, polyvinyl acetates, polyvinyl butyrals as well as blends, mixtures and copolymers thereof. Specific polymers include, but are not limited to, acrylic copolymers or homopolymers containing materials, such as, methyl methacrylate, ethyl methacrylate, butyl methacrylate, ethylene methacrylic acid, ethylene acrylic acid, acrylic acid, ethyl acrylate, methyl acrylate, butyl acrylate, iso-octyl acrylate, 2-ethylhexyl acrylate; polyurethane polymers and copolymers; vinyl copolymers such as vinyl chloride/vinyl acetate copolymers; and urethane/acrylate copolymers.

The present invention also relates to articles, wherein the coating composition of the present invention has been applied to in form of a layer. Accordingly, the present invention also concerns an article comprising a coating composition according to the present invention in form of at least one heat sealable, inkjet printable layer, i.e. a coating layer. The coating can be applied onto the temporary carrier layer by means of standard coating equipment as known in the art, e.g. by coating heads featuring a Mayer rod, or an air knife, roll coating, reverse roll coating, gravure printing, reverse gravure printing, die coating, bead coating, slide coating or curtain coating, without being limited to these. After the coating composition has been applied, the solvent is evaporated, preferably using hot air dryers, more preferably with forced air drying, e.g. impingement drying.

Such articles comprise both (i) image transfer materials, wherein the heat sealable, inkjet printable layer formed from the coating material of the present invention, optionally in conjunction with further layers, is adhered to a temporary carrier material as well as (ii) articles, wherein the heat sealable inkjet printable layer formed from the coating composition of the present invention has already been transferred to an object to be provided with graphical information via said image transfer process. The article of the present invention may comprise a multi-layer coating stack, which comprises one or more additional layers in addition to the heat sealable, inkjet printable layer formed from the coating composition of the present invention. In terms of the present invention, the term "multi-layer coating stack" refers to a coating comprising at least two layers in direct contact with each other. The one or more additional layers of said multi-layer coating stack preferably are positioned under the heat sealable inkjet printable layer of the present invention. Said additional layer(s) is/are preferably transferable together with the heat sealable, inkjet printable layer during the image transfer process, i.e. they directly or indirectly adhere to the heat sealable, inkjet printable layer of the present invention. Said additional layer(s) may add additional functions and benefits to the coating and preferably may be selected from the group comprising additional ink receiving layers, additional adhesive layers, protective layers, primer layers, layers to adapt gloss, roughness or feel of the outer surface of the transferred coating stack, layers for enhancing the mechanical and/or thermal resistance of the multilayer coating stack and combinations thereof.

Suitable compositions and materials for such additional layers are well known to a person skilled in the art and include e.g. scratch and/or chemical resistant layers based on cross-linked polyurethane, acrylate coatings or fluoropolymer coatings, or optical coatings to improve gloss, impart color or reduce reflection. These coatings may be cross-linked chemically, e.g. by reacting isocyanate groups or by curing using UV radiation, if isocyanate or UV reactive groups, respectively, are present in the formulation.

As already mentioned above, the article of the present invention may be a heat sealable, inkjet printable image transfer material, which comprises the at least one heat sealable, inkjet printable layer or the above-mentioned multi-layer coating stack, which comprises said heat sealable, inkjet printable layer in combination with one or more additional layers, over a temporary carrier layer. The temporary carrier layer serves to protect and/or stabilize the heat sealable, inkjet printable transfer layer or the respective multi-layer coating stack until it is indeed transferred to the object to be provided with said image. The temporary carrier layer may optionally be coated with one or more release layers in order to reduce the adhesion of the coating layer or the multilayer coating stack, respectively, to the temporary carrier layer.

Suitable temporary carrier layers and release layers are well known to those skilled in the art. Preferably, the temporary carrier layer may comprise a substrate selected from the group consisting of paper, metal films and foils, plastic films and foils, nonwoven fabrics and composites and combinations thereof. The release layer can be coated onto the temporary carrier before applying one or more optional intermediate layer(s) and the heat sealable inkjet printable coating layer. The release layer, if present, may comprise an organic release agent, e.g. selected from the group consisting of polyamides, amide waxes, montan waxes, polyolefine waxes, ester waxes, calcium stearate, zinc stearate, carbamate release coatings, e.g. polyvinyl carbamates, such as polyvinyl octadecyl carbamate, polyvinyl esters, acrylate copolymers, fatty acid esters, polysaccharides, polysiloxanes, long chain alkyl- or fluoroalkyl compounds, e.g. polymers having one or more alkyl chains with a chain length of at least 12 carbons atoms, preferably of from 13 to 30 carbon atoms, most preferably poly(meth)acrylates with alkyl side chains having 16 to 20 carbon atoms, and mixtures of the aforementioned release agents. If present, said release layer(s) preferably may be (a) silicone-based release layer(s), in particular a polysiloxane-containing layer. Furthermore, fluorine-containing substances or polymers, e.g. as coating or as temporary carrier film, are suitable for ensuring a proper release of the transfer layer(s), e.g. films made of polytetrafluoroethylene, polyvinylidene fluoride or polyvinyl fluoride.

The release agent(s) in the release coating ensure(s) that the temporary carrier can be removed from the transfer film very easily by hand. The release force between the temporary substrate material and the transfer layer(s) is measured according to FTM 3 (Finat Test Methods) and usually should be between 0.02 N/50 mm and 10 N/50 mm force per sample width. If the release force is too low, delamination may occur during printing. If the release force is too high, a proper transfer may not be possible. The release force may also be determined after transfer of the image transfer material to a target surface. In this case, the release/adhesion force to the target surface will be higher than the release force for removing the temporary carrier.

Preferably, the coating composition/layer or the multi-layer coating stack of the present invention, respectively, can be removed from the temporary substrate as a free-standing film. Such a film typically has an elasticity modulus between 50 and 1500 MPa and an elongation at break of 5% to 150%, measured according to ASTM D882-02.

If the article comprises a multi-layer coating stack as discussed above, the one or more additional layers preferably may be located between the temporary carrier layer (or the release layer, if present) and the heat sealable, inkjet printable layer, so that one outer surface of the heat sealable, inkjet printable image transfer material is composed of the heat sealable, inkjet printable layer and the other outer surface is formed from the temporary carrier layer.

Using the article of the present invention, wherein said article is a heat sealable, inkjet printable image transfer material as described above, graphical information may be applied to the surface of an object in order to obtain an article provided with said graphical information. Thus, the present invention further provides a method for applying graphical information to a surface of an object comprising the steps of (a) providing a heat sealable, inkjet printable image transfer material as described above, (b) applying graphical information to the heat sealable, inkjet printable coating composition by inkjet printing, (c) positioning the heat sealable, inkjet printable image transfer material over the surface of the object, (d) applying heat and/or pressure to the outer surface of the heat sealable, inkjet printable image transfer material to affix it to the surface of the object, and (e) removing the temporary carrier layer from the heat sealable, inkjet printable coating composition or the multi-layer coating stack, respectively, wherein the steps of applying graphical information to the heat sealable, inkjet printable coating composition and of removing the temporary carrier layer may independently carried out before or after the heat sealable, inkjet printable material is affixed to the surface of the object by heat and/or pressure.

Means and processes for applying heat and/or pressure to inkjet printable image transfer materials in order to affix them to the surface of an object are generally known in the art and include, among others, commercially available laminators with heated rollers on one or both sides of the lamination nip for sheet as well as roll material, heat presses and the like, without being limited to these.

Due to the advantageous properties of the heat sealable, inkjet printable coating composition of the present invention, it is possible to apply the graphical information to said layer of the coating composition by inkjet printing before or after the heat sealable, inkjet printable material is affixed to the surface of the object. Likewise, it is also possible to remove the temporary carrier layer before or after the heat sealable, inkjet printable material is affixed to the surface of the object. It is also possible to apply the graphical information to the heat sealable, inkjet printable coating composition by inkjet printing before or after the temporary carrier layer is removed. However, for practical reasons, it may generally be preferred that for the printing process the heat sealable, inkjet printable coating is adhered either to a temporary carrier layer or to the object to which the graphical information shall be applied. It will be understood that for applying graphical information to the heat sealable, inkjet printable coating composition after a layer formed from said composition is affixed to the surface of the object, the heat sealable, inkjet printable image transfer material of the present invention comprises no additional layers apart from the temporary carrier layer and the optional release layer(s) if the image transfer material comprises only one layer formed from the coating composition of the present invention, as otherwise the layer formed from the heat sealable, inkjet printable coating composition of the present invention would be covered by said additional layers when applied to the object and thus would not be susceptible for inkjet printing. Preferably, the heat sealable inkjet printable coating is printed before transferring it with the printed image to the target substrate.

The method of the present invention may further comprise one or more additional steps of modifying the outer surface of the heat sealable, inkjet printable image transfer material, in particular when a high gloss and highly smooth outer surface is exposed after transfer. Herein, the term "outer surface" refers to said surface which is opposite to the contact surface of the inkjet printable image transfer material and the object to which said material is or will be applied, i.e. the surface facing an observer. Such steps of modifying the outer surface preferably may include calendering, embossing, engraving, grooving and/or stamping, which is well known to persons skilled in the art. Preferably, the surface structure of the transferred print may be modified by contacting and pressing a structured surface, e.g. a surface-structured film or paper, at elevated temperatures, for instance at a temperature being in the range of from 50 to 150° C., e.g. in a heat press or in a lamination device, onto the transferred image. This procedure allows to modify the coating surface to a desired gloss level or surface structure, e.g. a grain.

Furthermore, the coating can be die cut before or after printing in order to transfer a defined area, e.g. for partially printing of the target substrate. Preferably, only the stack of the transfer layer(s) is die cut, e.g. before, during or after printing. The unprinted die cut areas may be removed from the temporary carrier before transfer of printed areas to the target substrate.

Alternatively it is also possible to provide the layer of the coating composition of the present invention with a structured surface by applying the coating composition to a temporary carrier layer having a structured surface. However, if the outer surface exposed after transfer has already a structured surface, the variance for further adjustments by post-treatment steps, e.g. embossing, may be limited. Therefore, an initial high gloss surface may be preferred which can be obtained by using a high gloss temporary carrier surface for coating the inventive layer(s). Preferably the gloss level of the surface of the carrier layer is more than 70%, particularly more than 80% measured at 60° (DIN EN ISO 2813:1999-06).

Preferably, the step of affixing the inkjet printable image transfer material to the surface of the object may be carried out at a temperature being in the range of from 60 to 170° C., preferably of from 80 to 130° C. Preferably, a typical pressure of commercially available roll laminating machines being in the range of from 1 to 20 bar may be applied, preferably at a temperature in the aforementioned ranges. More preferably, heat and pressure in the aforementioned ranges are applied in combination using a roll laminator or a heat press. Furthermore, the lamination speed is an important parameter to achieve a good transfer result. The lamination speed will be adjusted together with temperature and pressure depending on the thickness, the surface properties and the heat capacity of the substrate and usually may be in the range of from 0.1 to 30 m/min, preferably in the range of from 0.3 to 10 m/min. The optimal set of parameters for a particular material and use can be easily determined by a person skilled in the art.

In addition it is also possible to apply the printed, free standing image transfer film, which has been released from its support, by means of a hot air blower (e.g. a heat gun or a held hand hot air blower) and a wiper or squeegee to target materials with curved surfaces like cans or metal drums.

Using the method of the present invention, layers comprising the inkjet printable coating composition of the present invention or a multi-layer coating stack comprising said composition as described above, can be applied to a variety of surfaces, including paper, cardboard, glass, metals, stone, ceramics, porcelain, plastics, rubber, wood, woven and non-woven fabrics and mixtures as well as composites thereof, without being limited to these.

Accordingly, the present invention also relates to an article comprising the coating composition of the present invention in form of at least one heat sealable, inkjet printable layer, wherein said article is an object having applied said at least one heat sealable, inkjet printable layer or the above-described multi-layer coating stack over at least a part of its surface(s), wherein the surface(s) comprise(s) a material selected from the group consisting of paper, cardboard, glass, metal, stone, ceramics, porcelain, plastics, rubber, wood, woven and non-woven fabrics and mixtures and composites thereof.

Herein, said coating composition in form of the above at least one heat sealable, inkjet printable layer or multi-layer coating stack preferably has been applied to the object using the above-described inventive method.

If the coating composition of the present invention is present in the form of a coating layer, which optionally may already have been applied to an object to form an article as described above, the total thickness of the coating layer, including any additional layers which optionally may be present in a multi-layer coating stack, may preferably in the range of from 5 to 100 µm, more preferably of from 15 to 50 µm.

The coating composition of the present invention, if provided in form of a smooth and both sides glossy layer, as well as the whole transferable multi-layer coating stack, if further layers are present, preferably may have a haze of equal to or less than 10%, more preferably of equal to or less than 5%, even more preferably of equal to or less than 3%, measured with a Byk Gardner Haze-Guard Plus (Byk Gardner, Columbia, Md., USA) according to International standard ASTM D 1003, Procedure A.

Further, the present invention relates to a method of making a coating composition according to the present invention, which comprises the step of providing a mixture comprising at least one cellulose-based binding agent, at least one rosin-based tackifier and at least one plasticizer in at least one solvent. Suitable solvents and solvent mixtures are able to dissolve the polymer, tackifier and plasticizer resulting in a clear solution. Solvents having good solving properties for the cellulose-based binding agent are preferred. These include alcohols, ethers, esters, ketones, aromatic solvents, e.g. ethanol, propanol, butanol, isobutanol, methoxypropyl acetate, ethyl acetate, methyl acetate, acetone, methyl ethyl ketone, methyl isobutyl ketone, toluene, xylene and mixtures thereof, without being limited to these. Also strong solvents like dimethyl sulfone, dimethyl acetamide, diacetone alcohol etc. can be used. Mixtures, e.g. of high boiling and low boiling solvents, are preferred. Particularly, solvents with a boiling point being in the range of about 60 to 250° C. are suitable for dissolving the ingredients of the coating composition of the present invention, such as ethanol, isopropanol, n-propanol, butanol, diethyl ether, propylene glycol monomethyl ether, acetone, methyl ethyl ketone, methyl isobutyl ketone, ethyl acetate, butyl acetate, toluene and mixtures thereof, without being limited to these.

Suitable and preferred cellulose-based binding agents, rosin-based tackifiers, plasticizers as well as optional additional components have already been described above.

To provide the coating composition in the form of a layer, the method preferably further may comprise the steps of applying the mixture comprising the at least one cellulose-based binding agent, the at least one rosin-based tackifier and the at least one plasticizer in the at least one solvent to a substrate and then drying the mixture to remove the solvent(s) in order to obtain a dried coherent layer of the coating composition.

The substrate to which the mixture is applied to preferably may be a temporary carrier layer as already described above. If said temporary carrier layer is coated with one or more release layers, the coating composition of the present invention is applied over said one or more release layers. When a multilayer coating stack having one or more additional layers as described above is prepared, said additional layers are applied over the temporary carrier layer and the optional release layer, if present, before the coating composition of the present invention is applied over said additional layers.

The step of drying the mixture to remove the solvent(s) may be carried out using conventional means known to those skilled in the art, including air drying, drying under elevated temperature and/or reduced pressure, fan drying and the like, without being limited to these.

The heat sealable and inkjet printable coating can be used in many different ways and on a wide variety of target substrates. As examples (but not limited to these) it can be used in the form of transferred prints on/for:
- advertising, e.g. on boards, papers, plastic films or the like,
- envelopes, e.g. for books,
- crafting purposes,
- wallpapers,
- furnitures,
- flooring, e.g. on wood or MDF (medium density fibre board),
- textiles and garments,
- automotives, ships or airplane surfaces, e.g. for interior designs,
- proofing applications, e.g. packaging proof or contract proof,
- mock-ups, e.g. based on paper board or corrugated board,
- labels and tickets,
- banderoles, e.g. for plastic bottles,
- metallic surfaces, e.g. metallic films, cans, drums, barrels,
- glass and ceramic surfaces, e.g. mugs, bottles, glass plates,
- in-mould decoration of plastic parts, e.g. by injection moulding onto the printed transfer material.

EXAMPLES

Test Methods

Release Force:

The release force is determined by means of a tensile tester according to the Finat test method FTM 3 on 50 mm wide strips. For this purpose, the sample is separated manually to such an extent that the temporary substrate material and the self-supporting film, if relevant with intermediate layers, can be clamped in the holders of the tensile tester and then pulled apart at 300 mm/min, the force for this purpose being registered.

Haze:

The haze of transparent films is measured according to ASTM D 1003.

Print Quality:

A Roland printer comprising Eco-Sol MAX inks is used for print quality testing. A diagnostic test chart with 200 color patches is printed and evaluated concerning coalescence (uneven area fill of colored patches). Furthermore the optical density of a blue color patch (100% magenta+100% cyan) as well as a black color patch (100% magenta+40% cyan+100% yellow+100% black) is measured by a MacBeth densitometer (Kollmorgen Instruments Corporation, New Windsor, N.Y., USA).

Release:

The release of the temporary substrate from the coating layer(s) is evaluated before printing and after transfer to the target surface. If it can be separated with very low or low force by hand the rating is excellent or very good, respectively.

Adhesion after Transfer:

An adhesive tape (Tesa 4104; Beiersdorf, Hamburg, Germany) is applied onto the transferred print. If this tape can be removed by hand without removing or destroying the printed surface, the rating is excellent.

Example 1

50 g cellulose acetate butyrate (CAB-381-20, Eastman Chemical Company), 20 g of a glycerol ester of partially hydrogenated rosin and 23 g of acetyl triethyl citrate as well as 0.3 g Propyltex® 270S (polypropylene pigment with a mean particle size of 20 μm, Micro Powders Inc.) were dissolved in 200 g methyl ethyl ketone (MEK). The solution was casted onto a siliconized paper liner (Sappi Ultracast Adva Patent, Sappi Fine Paper Europe SA, Brussels, Belgium) by means of a bar coater (Erichsen Coatmaster 510, Erichsen GmbH & Co. KG, Hermer, Germany) with a gap of 200-250 μm. After drying at 105° C. in a laboratory oven a dry coating weight of 45 g/m$^2$ was achieved. This dry film was printed using a Roland printer equipped with Eco-Sol MAX inks with a mirrored image. The image quality obtained was excellent, particularly showing high brilliance, high color gamut and no coalescence. After drying the printed image was transferred onto different substrates by means of a hot roll lamination machine Seal Image 6000 Plus (Seal Graphics Europe B.V., Raalte, The Netherlands). The temperature was adjusted between 80 and 170° C. depending on transfer speed and substrate material used. Good adhesion of the transfer print was achieved on paper, polyethylene film, aluminum foil and cardboard.

The coating compositions and the detailed test results of this and the following examples are specified in Tables 1 and 2, respectively. Herein, the following abbreviations and trade names are used:
- MEK=methyl ethyl ketone
- Dowanol™ PM=propylene glycol monomethyl ether (The Dow Chemical Company, Midland, Mich., USA)
- CAB=cellulose acetate butyrate (Eastman Chemical Company, Kingsport, Tenn., USA)
- ATBC=acetyl tributyl citrate
- ATEC=acetyl triethyl citrate
- Propyltex® 270S=dispersible polypropylene pigment (Micro Powders Inc., Tarrytown, N.Y., USA)
- Elvacite® 2014=methyl methacrylate copolymer (Lucite International, Newton Aycliffe, UK)
- Palamoll® 632=medium viscosity polyester plasticizer, derived from adipic acid and 1,2-propanediol (BASF, Ludwigshafen, Germany)
- SAIB=saccharose acetate isobutyrate
- Estane® 5750=polyurethane (Lubrizol Advanced Materials, Cleveland, Ohio, USA)
- Degalan® 4792L=organic solution of an acrylic polymer based on ethyl methacrylate (Evonik Industries AG, Darmstadt, Germany)

Comparative Example 2-1

Example 1 was reproduced except that the tackifier resin was omitted. The print quality and the adhesion on polyethylene were not sufficient for high quality print applications.

Comparative Example 2-2

Example 1 was reproduced except that the tackifier resin was omitted and a different plasticizer was used (Palamoll® 632). The print quality and the adhesion on polyethylene and aluminum foil were not sufficient for high quality print applications.

Comparative Example 3

Example 1 was reproduced except that a non-rosin tackifier (SAIB) was used. The print quality and the adhesion on polyethylene and aluminum foil were not sufficient for high quality print applications.

Comparative Example 4

An additional heat seal coating was applied on top of the coating of Comparative Example 3. This coating comprised a 10% solution of Degalan® 4792L in 1:1 toluene:methyl ethyl ketone and was applied by means of a Mayer rod to achieve a dry coat weight of 2 g/m² after drying in an oven. Although the adhesion to different substrates had been improved, the print quality was worse than in Example 3. Furthermore, the haze of the two layer coating increased and in turn the optical density of the transferred print decreased.

Example 5

Instead of applying a top coat as in Comparative Example 4, the heat seal adhesive used in said comparative example was admixed into the inventive heat sealable and inkjet printable coating by replacing some quantity of the tackifier in example 1. Print quality as well as adhesion after transfer were excellent so that high quality transfer prints were obtained.

Example 6

A polyurethane (Estane® 5750) was added to a coating composition according to the present invention comprising CAB, acetyl tributyl citrate as a plasticizer and partially hydrogenated rosin ester. Print quality as well as adhesion after transfer were excellent so that high quality transfer prints are obtained.

Example 7

A polyacrylate (Elvacite® 2014) was added to the inventive formulation comprising CAB, acetyl tributyl citrate as a plasticizer and partially hydrogenated rosin ester. Print quality as well as adhesion after transfer were excellent so that high quality transfer prints are obtained.

Example 8

The formulation of Example 1 was varied concerning a higher content of CAB and a different rosin tackifier. Print quality as well as adhesion after transfer were excellent so that high quality transfer prints were obtained.

Example 9

First, an intermediate coating for improving scratch resistance was applied onto the siliconized paper as used in Example 1. 96 g of a water-based polyurethane dispersion (Permutex WF 13-495, Stahl Holdings B.V., Waalwijk, The Netherlands), 20 g of demineralized water and 5 g of aliphatic polyisocyanate (Permutex X 28-404, Stahl Holdings B.V) were mixed and applied within 2 hours by a Mayer bar coating to the siliconized side of the paper to yield 8 g/m² of dry coating after hot air drying.

In a second coating step the heat sealable inkjet coating of Example 8 was applied onto the scratch resistant coating. After imaging and transfer to a 100 μm polyethylene film the scratch resistance of the printed surface was strongly improved by the intermediate coating which is protecting the heat sealable inkjet layer and the substrate after transfer.

The scratch resistance was measured after treating the surface by means of a Taber Abraser 1535 tester (Taber Industries, North Tonawanda, N.Y., USA) with H22 wheels and 1000 g weight applied after 5 cycles at a speed of 60 cycles per minute. The relative gloss reduction by this treatment was recorded at a measuring angle of 20°. The gloss reduction is only 1.5% compared to a reduction of 24% for the transferred print surface as described in Example 8.

Example 10

The transfer media of Example 1 was transferred without printing to a 75 μm thick cast polyester film (amorph polyethylene terephthalate/APET-film) by means of the aforementioned lamination device at a temperature of 90° C., a pressure of 3 bar and a speed of 4 m/min. The siliconized paper was easily removed after cooling of the laminate. The laminate was then printed in the Roland printer as described in Example 1 onto the transferred layer. The adhesion to different substrates as well as the print results are as good as those obtained by transferring the heat sealable inkjet printable layer after printing (see e.g. Example 1).

TABLE 1

| Example | MEK | Toluene | Dowanol™ PM | CAB 381-20 | CAB 551-0.2 | ATBC | ATEC | Glycerol ester of partially hydrogenated rosin | Methyl ester of hydrogenated rosin | Propyltex® 270S | Elvacite® 2014 | Palamoll® 632 | SAIB (90%) | Estane® 5750 | Degalan® 4792L (55%) |
|---|---|---|---|---|---|---|---|---|---|---|---|---|---|---|---|
| 1 | 200.0 | | | 50.0 | | | 23.0 | 20.0 | | 0.3 | | | | | |
| C2-1 | 200.0 | | | 50.0 | | | 23.0 | | | 0.3 | | | | | |
| C2-2 | 200.0 | | | 4.8 | 44.2 | | | | | 0.3 | | 23.0 | | | |
| C3 | 200.0 | | | 50.0 | | | 23.0 | | | 0.3 | | | 20.0 | | |
| C4 | 200.0 | | | 50.0 | | | 23.0 | | | 0.3 | | | | | |
| 5 | 150.0 | 50.0 | | 50.0 | | | 23.0 | 14.3 | | 0.3 | | | | | 5.7 |
| 6 | 200.0 | | | 43.7 | | 8.8 | | 5.0 | | | | | | 6.3 | |
| 7 | 170.0 | | 30.0 | 38.00 | | 12.0 | | 3.0 | | | 12.0 | | | | |
| 8 | 200.0 | | | 40.0 | 10.00 | | 8.0 | | 5.0 | | | | | | |
| 9 | 200.0 | | | 40.0 | 10.00 | | 8.0 | | 5.0 | | | | | | |
| 10 | 200.0 | | | 50.0 | | | 23.0 | 20.0 | | 0.3 | | | | | |

TABLE 2

| | | Print Quality (before transfer) | | | | Adhesion after Transfer | | | |
|---|---|---|---|---|---|---|---|---|---|
| Example | Haze | Optical Density Blue | Optical Density Black | Coalescence | Release | Paper | Polyethylene film | Aluminum foil | Cardboard |
| 1 | 1.0 | 2.0 | 2.1 | 5 | 5 | 5 | 4 | 5 | 5 |
| C2-1 | 2.1 | 1.3 | 1.6 | 2 | 5 | 4 | 1 | 5 | 3 |
| C2-2 | 1.8 | 1.3 | 1.3 | 1 | 5 | 5 | 2 | 2 | 4 |
| C3 | 7.5 | 1.5 | 1,6 | 3 | 5 | 4 | 2 | 2 | 4 |
| C4 | 10.6 | 1.5 | 1.6 | 1 | 4 | 5 | 3 | 4 | 5 |
| 5 | 3.5 | 1.9 | 1.8 | 5 | 5 | 5 | 4 | 5 | 5 |
| 6 | 0.9 | 1.9 | 1.9 | 5 | 4 | 5 | 5 | 4 | 5 |
| 7 | 2.0 | 2.0 | 1.7 | 4 | 5 | 5 | 3 | 4 | 5 |
| 8 | 0.5 | 1.9 | 1.9 | 5 | 5 | 5 | 4 | 4 | 5 |
| 9 | 1.2 | 2.0 | 1.9 | 5 | 5 | 5 | 4 | 5 | 5 |
| 10 | 1.0 | 2.1 | 2.0 | 5 | 5 | 5 | 4 | 5 | 5 |

Rating:
1 = excellent
2 = very good
3 = good
4 = critical
5 = unacceptable/insufficient

LIST OF REFERENCE SIGNS 1 coating composition/heat sealable, inkjet printable layer
2 temporary carrier layer
3 release layer
4 additional layer
5 additional layer
6 additional layer
7 first outer surface
8 second outer surface
9 multilayer coating stack
10 heat sealable, inkjet printable image transfer material
11 object
12 article

What is claimed is:

1. A heat sealable, inkjet printable image transfer material comprising at least one coating layer and a temporary carrier layer, said at least one coating layer comprising:
   40 to 90 wt.-%, based on the dry weight of the composition, of one or more binding agents comprising at least one cellulose-based binding agent,
   5 to 50 wt.-%, based on the dry weight of the composition, of one or more tackifiers comprising at least one rosin-based tackifier,
   5 to 50 wt.-%, based on the dry weight of the composition, of one or more plasticizers.

2. The heat sealable, inkjet printable image transfer material according to claim 1, wherein
   the at least one cellulose-based binding agent is selected from the group consisting of cellulose esters, cellulose ethers and mixtures thereof and/or
   the at least one rosin-based tackifier comprises at least one fully or partially hydrogenated rosin or an ester thereof and/or
   the at least one plasticizer is selected from the group consisting of epoxidized oils, fatty acids as well as esters thereof, benzoates, glyceryl esters, esters of polycarboxylic acids with linear or branched aliphatic alcohols, (poly)glycol esters, sulfonamides, polymeric plasticizers and mixtures thereof.

3. The heat sealable, inkjet printable image transfer material according to claim 1, wherein the at least one cellulose-based binding agent comprises mixed cellulose esters.

4. The heat sealable, inkjet printable image transfer material according to claim 3, wherein the mixed cellulose esters comprise a combination of different acyl groups selected from the group consisting of acetyl, butyryl, propionyl and trimellityl groups.

5. The heat sealable, inkjet printable image transfer material according to claim 4, wherein the mixed cellulose esters are selected from the group consisting of cellulose acetate propionate and cellulose acetate butyrate and mixtures thereof.

6. The heat sealable, inkjet printable image transfer material according to claim 1, wherein the at least one rosin-based tackifier comprises at least one ester of a fully or partially hydrogenated rosin.

7. The heat sealable, inkjet printable image transfer material according to claim 1, wherein the at least one rosin-based tackifier comprises at least one ester of a fully or partially hydrogenated rosin selected from the group consisting of ethyl, ethylene glycol, diethylene glycol, glyceryl, methyl, pentaerythrityl and triethylene glycol esters and mixtures thereof.

8. The heat sealable, inkjet printable image transfer material according to claim 1, wherein the at least one rosin-based tackifier has a softening point in the range of from −50 to 150° C.

9. The heat sealable, inkjet printable image transfer material according to claim 1, wherein the at least one plasticizer is selected from the group consisting of epoxidized vegetable oils, oleates, caprates, tallates, glyceryl esters, (poly) glycol esters, alkyl azelates, alkyl citrates, alkyl glutarates, alkyl phthalates, alkyl trimellitates, alkyl adipates, alkyl sebacates, alkyl maleates, alkyl terephthalates, N-(n-butyl) benzene sulfonamide, polyesters of aliphatic dicarboxylic acids, and mixtures thereof.

10. The heat sealable, inkjet printable image transfer material according to claim 1 further comprising one or more additional binding agents selected from the group consisting of acrylic (co)polymers, polyurethanes, polyvinyl alcohols, polyvinyl acetates, polyvinyl butyrals as well as blends, mixtures and copolymers thereof, in the at least one coating layer.

11. The heat sealable, inkjet printable image transfer material according to claim 1, wherein the total thickness of the coating layers, including any additional layers, is in the range of from 5 to 100 μm.

12. The heat sealable, inkjet printable image transfer material according to claim 1, wherein the at least one rosin-based tackifier has a Gardner color of equal to or less than 7.

13. The heat sealable, inkjet printable image transfer material according to claim 1, wherein the at least one coating layer has a haze of equal to or less than 10%.

14. An article comprising the heat sealable, inkjet printable image transfer material according to claim 1 in form of at least one heat sealable, inkjet printable layer.

15. The article according to claim 14, wherein said article comprises a multilayer coating stack comprising one or more additional layers in addition to the heat sealable, inkjet printable layer, positioned under said heat sealable, inkjet printable layer which additional layers are transferable together with the heat sealable, inkjet printable layer.

16. The article according to claim 15, wherein said additional layers are selected from the group consisting of additional ink receiving layers, additional adhesive layers, protective layers, primer layers, layers to adapt gloss, roughness or feel of the outer surface of the transferred coating stack, layers for enhancing the mechanical and/or thermal resistance of the multilayer coating stack and combinations thereof.

17. The article according to claim 14, wherein said article is a heat sealable, inkjet printable image transfer material, comprising the at least one heat sealable, inkjet printable layer or the multilayer coating stack over the temporary carrier layer wherein the temporary carrier layer is coated with one or more release layers.

18. The article according to claim 17, wherein said temporary carrier layer comprises a substrate selected from the group consisting of paper, metal films and foils, plastic films and foils, nonwoven fabrics and composites and combinations thereof.

19. The article according to claim 18, wherein said release layer is a silicone-based release layer and said additional layers are located between the temporary carrier layer or the release layer and the heat sealable, inkjet printable layer.

20. A method for applying graphical information to a surface of an object comprising the steps of:
providing a heat sealable, inkjet printable image transfer material according to claim 17,
applying graphical information to the heat sealable, inkjet printable coating composition by inkjet printing,
positioning the heat sealable, inkjet printable image transfer material over the surface of the object,
applying heat and/or pressure to the outer surface of the heat sealable, inkjet printable image transfer material to affix it to the surface of the object,
removing the temporary carrier layer from the heat sealable, inkjet printable coating composition or the multilayer coating stack, respectively,
wherein the steps of applying graphical information to the heat sealable, inkjet printable coating composition and of removing the temporary carrier layer may be independently carried out before or after the heat sealable, inkjet printable material is affixed to the surface of the object by heat and/or pressure.

21. The method according to claim 20, further comprising one or more additional steps of modifying the outer surface of the heat sealable, inkjet printable image transfer material, preferably by calendering, embossing, engraving, grooving and/or stamping before, while and/or after the heat sealable, inkjet printable image transfer material is affixed to the object.

22. The method according to claim 21, wherein the step of affixing the inkjet printable image transfer material to the surface of the object is carried out using a roll laminator or a heat press.

23. The method according to claim 20, wherein the step of affixing the inkjet printable image transfer material to the surface of the object is carried out at a temperature in the range of from 60 to 170° C. and/or at a pressure in the range of from 1 to 20 bar.

24. The article according to claim 14, wherein said article is an object having applied said at least one heat sealable, inkjet printable layer or said multilayer coating stack over at least a part of its surface(s), wherein the surface(s) comprise(s) a material selected from the group consisting of paper, cardboard, glass, metal, stone, ceramics, porcelain, plastics, rubber, wood, woven and nonwoven fabrics and mixtures and composites thereof.

25. A method of making the heat sealable, inkjet printable image transfer material according to claim 1, comprising the steps of providing a mixture comprising at least one cellulose-based binding agent, at least one rosin-based tackifier and at least one plasticizer in at least one solvent.

26. The heat sealable, inkjet printable image transfer material according to claim 1, further comprising:
0.1 to 10 wt.-%, based on the dry weight of the composition, of one or more organic or inorganic pigments and/or fillers, and
one or more components selected from the group consisting of solvents, colorants and dyes, heat and/or ultraviolet light stabilizers, UV-absorbers, free radical scavengers, surfactants, dispersing aids, wetting agents, anti-foaming agents, de-aerators, rheological additives, substrate wetting and anti-cratering additives, ink fixing agents, flow improvers, antioxidants, brighteners, phosphorescence agents, cross-linking agents and mixtures thereof.

* * * * *